United States Patent Office  3,235,518
Patented Feb. 15, 1966

3,235,518
METHOD OF REACTING A REACTIVE HYDROGEN COMPOUND AND AN ISOCYANATE IN THE PRESENCE OF AN ORGANIC ANTIMONY, ARSENIC OR BISMUTH CATALYST
Fritz Hostettler and Eugene F. Cox, Charleston, W. Va., assignors to Union Carbide Corporation, a corporation of New York
No Drawing. Filed Sept. 30, 1963, Ser. No. 312,352
34 Claims. (Cl. 260—2.5)

This application is a continuation-in-part of Serial No. 686,030, filed September 25, 1957, and Serial No. 778,558, filed December 8, 1958, both abandoned.

This invention relates to methods for accelerating reactions of organic compounds having reactive groups of the formula —NCY, in which Y is oxygen or sulfur, with compounds having groups containing reactive hydrogen as determined by the Zerewitinoff method described in J. Am. Chem. Soc., vol. 49, page 3181 (1927). The methods of this invention are generically useful in promoting reactions of isocyanates and isothiocyanates with a wide variety of active hydrogen-containing compounds and have found particular and immediate applicability in the preparation of polyurethanes, a broad class of organic polymers formed by the reaction of di- or polyisocyanates or di- or polyisothiocyanates with a large variety of difunctional or polyfunctional compounds containing active hydrogen atoms such as found in hydroxyl or amino groups, e.g., water, polyols, polyamines, polyethers, polyesters, polyoxy-carbooxy alkylenes, and the like. The methods of this invention are useful in the manufacture of foams, gum stocks, elastomeric materials, and the like.

A very considerable number of materials have heretofore been proposed as catalysts for accelerating isocyanate reactions generally and polyurethane preparations in particular. One of the most important disadvantages that is common to all but a few of the catalysts known to have been proposed is that they do not accelerate the reaction sufficiently to bring it within the realm of practical utility. Tertiary amines, the most popular catalysts known to have been proposed heretofore, provide slow reaction rates when used alone unless used in unsatisfactorily large amounts, typical formulations requiring one to three parts by weight of the tertiary amine per 100 parts of total composition. Another very serious disadvantage of the proposed catalysts, including tertiary amines, is that they require elevated temperatures in reactions involving aromatic isocyanates and are essentially inactive in promoting reactions of aliphatic isocyanates at any reasonable temperature. Tertiary amines often impart an undesirable odor to reaction products of organic isocyanates with active hydrogen-containing compounds and, due to their basic characteristics, catalyze the degradation of the reaction products or polymers once they are formed. Cobalt naphthenate, another popular catalyst, has the disadvantage of imparting undesired color to the reaction product and of requiring a petroleum base solvent which leads to the formation of tacky foams of relatively high density. Strong bases such as sodium hydroxide, which provide greater acceleration, frequently lead to uncontrollable reactions, particularly in forming polyurethane foams, and bring about excess cross-linking. Ferric acetylacetonate, a compound considered to be nonorganometallic because of the absence of any carbon to metal bond, is active but has the disadvantages of being colored and of being catalytically active in oxidative degradation of organic compounds. Other disadvantages of heretofore proposed catalysts include discoloration, particularly yellowing on aging of the reaction products, poor control over the progress of the reaction and a tendency to require use of high temperatures to bring about a satisfactory rate of reaction.

We have found that organic compounds of the tri- and pentavalent elements in Group V(B) having molecular weights over 74, i.e., arsenic, antimony and bismuth, referred to herein as elements of the arsenic family or even more simply as the key atoms or elements, that are characterized by the presence therein of at least one direct bond between carbon and an atom of the arsenic family are ideally suited for accelerating reactions of organic compounds having one or more reactive —NCY groups, in which Y is oxygen or sulfur, with compounds having groups containing active hydrogen. Reaction rates that are obtainable with these compounds are up to several hundred times and often up to many thousand times the rates achieved with the best catalysts heretofore proposed. These catalysts furthermore are essentially colorless; can be used in extremely small concentrations; have no tendency to degrade a polymer after it is formed; generally introduce no troublesome odor problems; permit reactions at practicable and controllable rates without, in most instances, requiring heating of the reactants; and broaden the field of useful isocyanates for polyurethane formation to include such relatively non-reactive materials as aliphatic isocyanates and isothiocyanates. They are particularly effective in the preparation of rigid foams.

Extensive testing of a large variety of such organic catalysts has indicated that while they vary somewhat in their activity, all organic compounds having a direct bond between carbon and a key atom, i.e., an element of the arsenic family, possess outstanding catalytic activity, as demonstrated in test results later described. The compounds may, in addition, also have one or more bonds from a key atom to a halogen, hydrogen, oxygen, sulfur or nitrogen atom. Among the many types of such organic compounds containing arsenic, antimony or bismuth, of which specific representative compounds have been tested and shown to be active, are:

(A) Compounds having three or five carbon to key atom bonds, such as tributylarsine, trioctylarsine, tribenzylarsine, trivinylarsine, triphenylarsine, trimethylstibine, triethylstibine, tributylstibine, trioctylstibine, trivinylstibine, triphenylstibine, pentaphenylstibine, trimethylbismuthine, triethylbismuthine, tributylbismuthine, trioctylbismuthine, trivinylbismuthine, triphenylbismuthine, and the like.

(B) Compounds having at least one carbon to key atom bond in which the remaining valences of the tri- and pentavalent key atoms are taken up by bonds to hydrogen or halogen atoms or hydroxyl groups, such as octylarsine, octyldichloroarsine, phenyldimercaptoarsine, phenylarsenic sesquisulfide, octyldichloroarsine dichloride, phenyldichloroarsine dichloride, methyldichlorostibine, butyldichlorostibine, octyldichlorostibine, lauryldichlorostibine, vinyldichlorostibine, phenyldichlorostibine, methyldichlorostibine dichloride, octyldichlorostibine dichloride, phenyldichlorostibine dichloride, methyldichlorobismuthine, butyldichlorobismuthine, octadecyldichlorobismuthine, phenyldichlorobismuthine, dibutylarsine, dioctylchloroarsine, diphenylchloroarsine, dibutylchloroarsine dichloride, dimethylchlorostibine, dibutylchlorostibine, dioctylchlorostibine, diphenylchlorostibine, dimethylchlorostibine dichloride, dibutylchlorostibine dichloride, diphenylchlorostibine dichloride, dimethylchlorobismuthine, dioctylchlorobismuthine, diphenylchlorobismuthine, tributylarsine dichloride, tributylarsine chloride cyanide, triphenylarsine dichloride, trimethylstibine dichloride, tributylstibine dichloride, trioctylstibine dichloride, triphenylstibine dichloride, triphenylstibine iodide cyanide, triphenylbismuthine dichloride, tetrabutylarsonium hydroxide, tetrabutylarsonium iodide, tetraethylstibonium iodide, and the like.

(C) Compounds having up to three direct bonds between carbon and key atoms and at least one double bond from the key atom to oxygen or sulfur, such as arsenosooctane, arsenosobenzene, thioarsenosododecane, isoamylarsenic disulfide, tributylarsine oxide, triphenylarsine oxide, tributylarsine sulfide, stibosobutane, stibosooctane, stibosobenzene, thiostibosobenzene, triethylstibine oxide, tributylstibine oxide, trioctylstibine oxide, triphenylstibine oxide, tributylstibine sulfide, octylbismuth oxide, phenylbismuth oxide, octylbismuth dioxide, and the like.

(D) Compounds having at least one direct bond from carbon to a key atom and having both a double bond from the key atom to oxygen or sulfur and in addition at least one bond from the key atom to a halogen atom or a hydroxyl group, such as phenyldichloroarsine oxide, octylarsonic acid, phenylarsonic acid, dibutylarsinic acid, diphenylarsinic acid, methylstibonic acid, octylstibonic acid, phenylstibonic acid, dimethylstibinic acid, dibutylstibinic acid, dioctylstibinic acid, dioctadecylstibinic acid, diphenylstibinic acid, and the like.

(E) Compounds having at least one direct bond from carbon to a key atom and the remaining valences occupied by bonds to oxygen, sulfur or nitrogen linking organic radicals to the key atom, such as butyldioctoxyarsine, lauryldiphenoxyarsine, phenylarsenic dilaurate, octylarsenic dibenzenesulfonamide, methyldithiolaurylarsine, butyldioctoxystibine, phenyldibutoxystibine, butyldithiolaurylstibine, butyldiacetoxystibine, octyldiacetoxystibine, phenyldiacetoxystibine, butylantimony dilaurate, octylantimony dibenzenesulfonamide, octyldibutoxybismuthine, butylbismuth dilaurate, butylbismuth dibenzenesulfonamide, butylbismuth bis(octyl maleate), dibutylbutoxyarsine, dibutylphenoxyarsine, dibutylacetoxyarsine, dibutylarsenic laurate, dibutylarsenic toluenesulfonamide, dibutylthiolaurylarsine, dibutylbutoxystibine, dibutylantimony laurate, dibutylacetoxystibine, diphenylacetoxystibine, dibutylthiolaurylstibine, dibutylantimony benzenesulfonamide, and the like.

(F) Compounds having two or more key atoms that may or may not be bonded to one another but have at least one carbon atom bonded to each key atom and possibly also bonds from the key atoms to hydrogen, halogen, oxygen, sulfur or nitrogen, such as arsenopropane, arsenobenzene, sym-diphenyldiiododiarsine, bis(dibutylarsenic)oxide, bis(dioctylarsenic)oxide, bis(diphenylarsenic)oxide, bis(dibutylarsenic)sulfide, bis(dimethylantimony)oxide, bis(dibutylantimony)oxide, bis(dioctylantimony)oxide, bis(diphenylantimony)oxide, bis(dibutylantimony)sulfide, bis(diphenylantimony)sulfide, tetramethyldistibine, tetraethyldistibine, tetraoctyldistibine, tetraphenyldistibine, bis(dibutylbismuth)oxide, tetramethyldibismuthine, and the like.

It is to be understood that the organic radicals linked to the key atoms directly or through oxygen, sulfur or nitrogen need not be the same in any given compound and that the structure of the compound need not in any sense be symmetrical.

The ability of representative compounds characterized by a direct bond between carbon and an arsenic, antimony or bismuth atom to accelerate isocyanate reactions is demonstrated by reacting phenyl isocyanate with methanol under essentially identical and controlled conditions. This reaction is important in such processes as the formation of polyurethanes by reaction of isocyanates with polyethers or polyesters. These tests were carried out in each instance by admixing equimolar amounts of phenyl isocyanate and methanol in n-butyl ether as solvent, adding a different catalyst to the mixture, and observing the rate of reaction at 30° C. The reaction, catalysts and relative rates based on one mol percent of catalyst per mol of isocyanate are shown immediately below in Table A:

TABLE A (I) 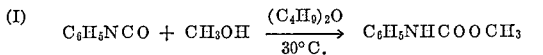

$$C_6H_5NCO + CH_3OH \xrightarrow[30°C.]{(C_4H_9)_2O} C_6H_5NHCOOCH_3$$

| Catalyst: | Relative rate |
|---|---|
| None | 1 |
| p-Toluenesulfonic acid | 2 |
| Acetic acid | 3 |
| N-methylmorpholine | 3 |
| Triethylamine | 11 |
| Triphenylamine | 1.5 |
| Cobalt naphthenate | 23 |
| Sodium methoxide | 140 |
| Ferric chloride | 180 |
| Tri-n-butylarsine | 500 |
| Triethylstibine | 930 |
| Tri-n-butylstibine | 200 |
| Tri-n-octylstibine | 830 |
| Triethylbismuthine | 710 |
| Triphenylbismuthine | 23 |
| Phenyldichlorostibine | 120 |
| Tri-n-butylarsine oxide | 100 |
| Triethylstibine oxide | 1600 |
| Tri-n-butylstibine oxide | 110 |
| Tri-n-octylstibine oxide | 600 |
| Triphenylstibine oxide | 80 |

This data indicates that when used alone triphenylbismuthine, one of the least active catalysts listed as having direct bonds from carbon to a key atom, is more than twice as active as triethylamine, the strongest of several tertiary amines examined. Others such as tributylarsine, triethylstibine oxide and triethylbismuthine oxide, when used alone also have catalytic activity very much more effective than triethylamine. Cobalt naphthenate, which has been used in some isocyanate reactions but has the disadvantage of discoloring the reaction product, is about twice as active as triethylamine. Sodium methoxide is moderately active, considerably better than amines, but by no means approaching the activity of the better organic arsenic, antimony and bismuth compounds listed and unsuitable because of premature gelling of the reactants.

When the same reaction is carried out in dioxane as solvent, the relative rates are as set forth in Table B:

TABLE B (II) 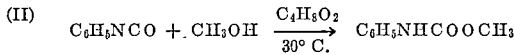

$$C_6H_5NCO + CH_3OH \xrightarrow[30°C.]{C_4H_8O_2} C_6H_5NHCOOCH_3$$

| Catalyst: | Relative rate |
|---|---|
| None | 1 |
| Triethylamine | 100 |
| Phenyldichlorostibine | 1400 |

This data shows the catalytic activity of a compound representative of the arsenic, antimony and bismuth compounds also to be highly effective when the reaction is carried out in dioxane under otherwise similar conditions.

The foregoing data illustrates the remarkably high catalytic activity of organic compounds of the arsenic family having at least one direct bond between carbon and a key atom (arsenic, antimony or bismuth) when such compounds are used alone. The reaction accelerated was chosen to provide accurate means for comparison of reaction rates under carefully controlled conditions and as a guide to the magnitude of "catalytic amounts" involved without in any sense being considered limitative to the scope of the invention.

We have also discovered quite unexpectedly that catalyst compositions comprising mixtures of said organic compounds of the tri- and pentavalent elements in Group V(B) and tertiary amines are particularly adapted for use in accelerating the reaction between isocyanates or isothiocyanates and compounds having groups containing active hydrogen atoms. It has been observed that such catalyst compositions of a Group V(B) element compound and a tertiary amino compound apparently exert a synergistic effect since the reaction rates that are obtainable therewith are of the order of from about two to about seven times the best reaction rate of the Group V(B) element compound when it is employed as the sole catalyst for the reaction.

The ability of representative compositions comprising an organo compound of the arsenic family having at least one direct bond between carbon and the key atom of said family and tertiary amines to catalyze isocyanate reactions yielding the urethane linkage or structure is vividly demonstrated by reacting phenyl isocyanate and n-butanol under carefully controlled conditions. The tests were carried out in each instance by admixing equimolar amounts (approximately 0.25 mole of each) of phenyl isocyanate and n-butanol in dioxane as a solvent, adding a different catalyst to each mixture and observing the rate of reaction at 70° C. The reaction, catalysts and relative rates based on mol percentage of catalyst per mol of isocyanate are as indicated immediately below in Table C:

TABLE C (III)
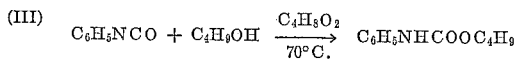

| Organo-metallic catalyst | Mol percent of catalyst | Amine catalyst | Mol percent of amine catalyst | Relative rate |
|---|---|---|---|---|
| Triethylstibine oxide | 0.0196 | | | 15.4 |
| Do | 0.0105 | | | 10.7 |
| | | Triethylamine | 9.1 | 70 |
| | | do | 0.88 | 6.7 |
| Do | 0.0105 | do | 1.01 | 29 |
| Do | 0.0196 | do | 0.96 | 45 |
| Do | 0.0196 | do | 0.096 | 28 |
| Do | 0.0196 | do | 0.0096 | 16.2 |
| Do | 0.0196 | N,N,N',N'-tetramethyl-1,3-butane-diamine. | 0.102 | 45 |
| | | do | 1.01 | 29 |
| | | 1,4-diazabicyclo[2,2,2]octane. | 0.95 | 110 |
| | | do | 0.100 | 13.4 |
| Do | 0.0196 | do | 0.109 | 65 |
| Without catalyst | | | | 1.0 |

Another very important reaction in polyurethane chemistry is the formation of the urea linkage by the reaction of isocyanates and water:

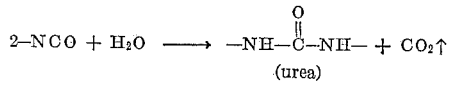
(urea)

The isocyanate residues are linked together by the urea linkages

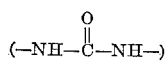

and the carbon dioxide gas formed produces an expanded material.

Still another very important reaction in polyurethane chemistry is the formation of the biuret linkage by the reaction of isocyanates and the urea linkage as illustrated by the reaction of the isocyanates and diphenylurea:

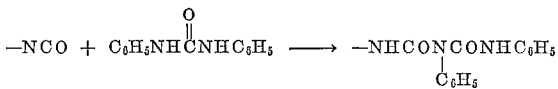

Results similar to those described above in connection with the phenyl isocyanate and butanol reaction are obtained with the catalyst compositions herein described.

The foregoing data in Table C illustrate the remarkable high catalytic activity of the combinations comprising mixtures of organic compounds of the arsenic family characterized by the presence therein of at least one direct bond between carbon and an atom selected from the group consisting of arsenic, antimony and bismuth and tertiary amines. The reactions accelerated were chosen to provide accurate means for comparison of reaction rates under carefully controlled conditions and to serve as a guide to the magnitude of "catalytic amounts" involved without in any sense being considered limitative of the scope of the invention. Any amount of catalyst composition can be employed; however, a concentration in the range of about 0.01 to about 5.0 weight percent based on the weight of the total reaction mixture is recommended, although amounts above and below the above-recommended range can be employed if desired.

The molar concentrations of the ingredients of the catalyst compositions can be varied over a wide range since the molar concentrations of the respective ingredients is not necessarily a critical feature of the invention. Molar concentration ratios of organic metal compound of the class described to amine can be varied from 100:1 to 1:10,000 although molar concentrations above and below the above recommended ratios can be employed if desired.

The tertiary amines which are useful as components of the catalyst compositions suitable for use in the methods of the invention include tertiary amines substantially unreactive with isocyanate groups and tertiary amines containing active hydrogen atoms reactive with isocyanate groups. Typical tertiary amines which are substantially unreactive with isocyanate groups include triethylamine,
tributylamine,
trioctylamine,
N-methylmorpholine,
N-ethylmorpholine,
N-octadecylmorpholine (N-cocomorpholine),
N-methyldiethanolamine,
N,N-dimethylethanolamine,
N,N'-bis(2-hydroxypropyl)piperazine,
N,N,N',N'-tetramethylethylenediamine,
N,N,N',N'-tetramethyl-1,3-propanediamine,
triethylenediamine (1,4-diazabicyclo[2,2,2]octane),
1,4-bis(2-hydroxypropyl)-2-methylpiperazine,
N,N-dimethylbenzylamine,
N,N-dimethylcyclohexylamine,
benzyltriethylammonium bromide,
bis(N,N-diethylaminoethyl) adipate,
N,N-diethylbenzylamine,
N-ethylhexamethyleneamine,
N-ethylpiperidine,
alpha-methylbenzyldimethylamine,
dimethylhexadecylamine,
3-methylisoquinoline,
dimethylcetylamine, and isocyanates and organometallic compounds of the key atoms containing tertiary nitrogen atoms, and the like.

Typical tertiary amines containing active hydrogen atoms reactive with isocyanate groups include triethanolamine, triisopropanolamine, N-methyldiethanolamine, N-ethyldiethanolamine, polyoxyalkylene polyol polymers and copolymers of alkylene oxides, such as propylene oxide, ethylene oxide, homopolymers, copolymers and mixtures thereof started with triethanolamine, triisopropanolamine, ethylene diamine, ethanolamine, diethylenetriamine and the like. Still other tertiary amines containing active hydrogen atoms reactive with isocyanate groups include polyesters based on polyols such as illustrated above including triethanolamine, triisopropanolamine, N-alkyl diethanolamines, and the like, as well as polycarboxylic acids containing tertiary nitrogen atoms.

The terms "isocyanate" and "isothiocyanates" are used herein to refer to mono- and polyisocyanates and to mono- and polyisothiocyanates, respectively, including particularly diisocyanates and diisothiocyanates. While the invention has been described specifically with reference to the reaction of certain monoisocyanates, diisocyanates and monoisothiocyanates, it is generally applicable to the reaction of any compound containing one or more —N=C=Y groups in which Y is oxygen or sulfur. Compounds within this generic definition include monoisocyanates and monoisothiocyanates of the general formula

RNCY in which R is a hydrocarbon or substituted hydrocarbon radical such as alkyl, cycloalkyl, alkenyl, alkynyl, aralkyl, aryl, alkaryl, or a substituted analogue thereof. Examples of such compounds include methyl isocyanate, ethyl isocyanate, butyl isocyanate, octyl isocyanate, octadecyl isocyanate, vinyl isocyanate, isopropenyl isocyanate, ethynyl isocyanate, benzyl isocyanate, phenyl isocyanate, vinylphenyl isocyanate, tolyl isocyanate, ethyl isothiocyanate and phenyl isothiocyanate. Also included are polyisocyanates and polyisothiocyanates of the general formula R'(NCY)$_x$ in which $x$ is two or more and and R' can be alkylene, substituted alkylene, arylene, substituted arylene, a hydrocarbon or substituted hydrocarbon containing one or more aryl —NCY bonds and one or more alkyl —NCY bonds, a hydrocarbon or substituted hydrocarbon containing a plurality of either aryl —NCY or alkyl —NCY bonds. R' can also include radicals such as —R'—Z—R'— where Z may be any divalent moiety such as —O—,

—O—R'—O—, —CO—, —CO$_2$—, —S—

—S—R'—S—, —SO$_2$—, etc. Examples of such compounds include hexamethylene diisocyanate, 1,8-diisocyanate-p-menthane, xylylene diisocyanates, (OCNCH$_2$CH$_2$CH$_2$OCH$_2$)$_2$ 1-methyl-2,4-diisocyanatocyclohexane, phenylene diisocyanates, tolylene diisocyanates, chlorophenylene diisocyanates, diphenylmethane-4,4'-diisocyanate, naphthalene-1, 5 - diisocyanate, triphenylmethane - 4,4',4''-triisocyanate, xylylene-alpha,alpha'-diisothiocyanate, isopropylbenzene-alpha-4-diisocyanate, and the like.

Further included are dimers and trimers of isocyanates and diisocyanates and polymeric diisocyanates of the general formulae:

(R'NCY)$_x$ and R'(NCY)$_{xy}$ in which $x$ and $y$ are two or more, as well as compounds of the general formula M(NCY)$_x$ in which $x$ is one or more and M is a monofunctional or polyfunctional atom or group. Examples of this type include ethylphosphonic diisocyanate, C$_2$H$_5$P(O)(NCO)$_2$; phenylphosphonous diisocyanate, C$_6$H$_5$P(NCO)$_2$; compounds containing a ≡Si—NCY group, isocyanates derived from sulfonamides (RSO$_2$NCO), cyanic acid, thiocyanic acid, and compounds containing a metal —NCY group such as tributyltin isocyanate.

It is also to be understood that the active hydrogen-containing compounds that are capable of reacting with isocyanates in accordance with the method of the invention are by no means limited to compounds containing hydroxyl and amino groups but generically include all compounds which give a positive test for reactive hydrogen as determined by the Zerewitinoff method. Typical of the active hydrogen-containing compounds whose reaction with isocyanates and isothiocyanates may be accelerated, and in some instances even made possible, are compounds containing an oxygen-hydrogen bond, such as water, hydrogen peroxide, alcohols, hydroperoxides, phenols, boronic acids, carboxylic acids, percarboxylic acids and sulfonic acids; compounds containing a nitrogen-hydrogen bond, such as ammonia, amines, amides, lactams, ureas, urethanes, allophanates, biurets, acyl ureas thioureas, hydrazines, oximes, amidines, hydroxylamines, hydrazones, hydroxamic acids, nitramines, diazoamino compounds; and sulfonamides; compounds containing a sulfur-hydrogen bond, such as mercaptans, thiophenols and thioacids; halogen acids; compounds containing active methylene groups and compounds capable of forming enols such as acetone, malonic esters, acetoacetic esters, acetylacetone and nitromethane; and miscellaneous active hydrogen-containing compounds, such as acetylenic compounds and dialkyl phosphonates. Also included among the applicable active hydrogen-containing compounds are compounds containing two or more of any one or combination of active hydrogen groups already described. Examples include ethylene glycol, diethylene glycol, hexamethylene glycol, glycerol, 1,2,6-hexanetriol, sorbitol, dextrin, starch, cellulose, polyvinyl alcohol, ethylene-vinyl alcohol copolymers, cellulose acetate, shellac, castor oil, polyesters, polyesterethers, alkyl resins, polyvinyl acetals, polyvinyl ketals, polyethers, polyetheresters, polyacrylic acids, ethylene diamine, hexamethylene diamine, ethanolamines, polyesteramides, poly(hexamethylene adipamide), wool, and proteins. Materials such as glass and metal which have thin films of moisture on their surfaces at time of reaction with an isocyanate or isothiocyanate are also included.

The methods of the invention are particularly suitable for reaction of organic polyisocyanates with high molecular weight polymers having at least two end groups containing reactive hydrogen. A preferred class of such polymers includes the polyoxyalkylene polyols. These are long chain polyols containing one or more chains of connected oxyalkylene groups. Most desirably, these polyoxyalkylene polyols are liquids having an average molecular weight in the range of 500 to 5000.

Examples of these polyoxyalkylene polyols include linear and branched polyethers having at least one and preferably a plurality of ether linkages and containing at least two hydroxyl groups and being substantially free from functional groups other than hydroxyl. Among the most preferred polyoxyalkylene polyols which are useful in the practice of this invention are the polyethylene glycols having average molecular weights of 200, 400, 600 and 1000 and the polypropylene glycols having average molecular weights of 400, 750, 1200 and 2000. Polymers and copolymers of polyoxyalkylene polyols are also adaptable in the process of this invention as well as the block copolymers of ethylene oxide and propylene oxide. Among the copolymers of polyoxyalkylene polyols, and particularly propylene oxide, that deserve some special mention are the ethylene oxide and propylene oxide adducts of ethylene glycol, propylene glycol, 2-ethylhexanediol-1,3, glycerol, 1,2,6-hexanetriol, trimethylolpropane, trimethylolethane, pentaerythritol, sorbitol, tris(hydroxyphenylpropane), triethanolamine, triisopropanolamine, ethylenediamine, diethylenetriamine and ethanolamine, more fully described hereinafter. Linear and branched heteric copolyethers of ethylene oxide and propylene oxide have also been found to be useful in making the foamed products of this invention with the preferred ones being those containing 10 weight percent ethylene oxide in the copolymer and having molecular weight of 500, 2000, 3000, 4000 and 5000.

Further useful types of polyetherpolyols are block copolymers prepared from propylene oxide and ethylene oxide. These polyethers can be characterized by reference to the following general formulas:

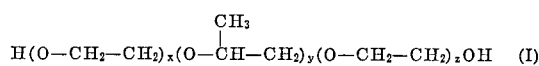

and

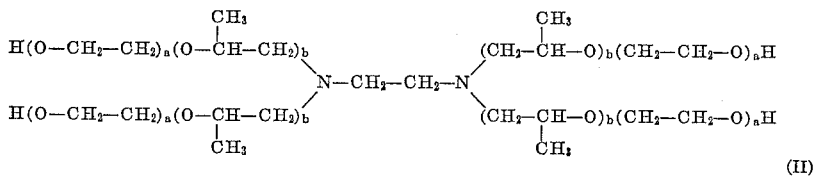

(II)

where in Formula I subscripts, *x*, *y* and *z*, represent positive integers in the range of from 2 to 100 and the subscripts *a* and *b* of Formula II represent positive integers in the range of from 1 to 200.

Polyethers having a highly branched chain network are also useful. Such highly branched chain polyethers are readily prepared from alkylene oxides of the type above described and initiators having a functionality greater than two. Highly branched polyethers have the advantage of making possible cross linking without the interaction of urea or urethane groups with the isocyanate groups. This has the advantage of making a larger proportion of the isocyanate used available for the evolution of carbon dioxide and the reducing of the overall amount of isocyanate that is required in the preparation of the foamed polymer.

The higher functional initiators that are useful with the alkylene oxides, described above, include polyols, polyamines and amino alcohols having a total of three or more reactive hydrogen atoms on hydroxyl and primary or secondary amino groups. Suitable polyols include triols, such as glycerol, trimethylolpropane, butanetriols, hexanetriols, trimethylolphenol, tris(hydroxyphenyl)propane, tris(hydroxyxylyl)propane, novalaks, trialkanolamines, various tetrols, such as erythritol and pentaerythritol; pentols; hexols, such as dipentaerythritol and sorbitol, as well as alkyl glucosides, carbohydrates, polyhydroxy fatty acid esters such as castor oil, and polyoxy alkylated derivatives or poly-functional compounds having three or more reactive hydrogen atoms, such as, for example, the reaction product of trimethylolpropane, glycerol and other polyols with ethylene oxide, propylene oxide or other epoxides or copolymers thereof, e.g., copolymers of ethylene and propylene oxides. Higher functional amino alcohols and polyamines include, by way of example, ethanolamine, diethanolamine, triethanolamine, isopropanolamine, diisopropanolamine, triisopropanolamine, 2-(2-amino - ethylamino)ethano, 2 - amino-2-(hydroxymethyl) - 1,3 - propanediol, diethylenetriamine, triethylenetetramine, urea and urea-formaldehyde polymers as well as various aryl polyamines, such 4,4',4''-methylidynetrianiline.

Another means of increasing the degree of branching, if desired, when employing linear polyethers, is to include a highly functional initiator, as described above, in the mixture charged to the reaction.

Preferred polyethers of the branched type are those prepared by adding propylene oxide to various diols, triols, tetrols and polyols as starters to produce adducts of various molecular weights. Polyethers which deserve special mention are the 1,2,6-hexanetriol and glycerol adducts of propylene oxide having molecular weights of 250, 500, 700, 1500, 2500, 3000, and 4000.

The amount of highly functional initiator normally employed with the linear type polyethers described above is an amount in the range of from 0.5 to 6.0 percent by weight of said initiator based on the weight of polyether charged to the reaction.

Generally, the polyethers suitable for employment can be conveniently characterized as normally liquid (although meltable solid polyethers are not excluded), pourable polyethers having viscosities in the range of from 50 centipoises to about 500,000 centipoises at room temperature (i.e., 25° C.) and having preferably molecular weights in the range of from 200 to about 10,000.

When employing polyethers having molecular weights in the range herein described, it is readily apparent that foams can be prepared which are tailor-made to the requirements of specific applications. For example, where maximum flexibility of the foamed polymer is a primary requirement the polyether should, for optimum results, have a molecular weight of approximately 1500–7000 if it is a branched type polyether, and somewhat less, about 1000–2000, if it is a substantially linear type polyether. While it has not been definitely established for semi-rigid foams, the molecular weight of branched polyethers should be in the range of from 700 to about 1500 and of linear polyethers in the range of from 250–1000. When it is desired to produce a rigid foam, the molecular weight of the starting polyether should be in the range of from 250–1000 if the polyether is branched; if linear, the molecular weight of the polyether should be somewhat less, that is, about 200–500.

Further examples of the class of polyoxyalkylene polyols include polyoxybutylene glycols and copolymers, such as polyoxyethylene oxybutylene glycols and polyoxypropyleneoxybutylene glycols. Included in the term "polyoxybutylene glycols" are polymers of 1,2-butylene oxide, 2,3-butylene oxide and 1,4-butylene oxide.

The polyesters and polyesteramides are formed from polyfunctional materials, such as polycarboxylic acids, aminocarboxylic acids, glycols, aminoalcohols, diamines and the like. The polyesters are readily prepared by reacting at least two bifunctional ingredients; a glycol and a dibasic acid. The polyesteramides are readily prepared by reacting a dibasic acid with a mixture comprising a major amount of a glycol and a minor amount of an amino alcohol or a diamine. Additionally, a wide variety of complex polyesters and polyesteramides can be formed by the reaction of a plurality of acids, glycols, amino alcohol and polyamines.

Representative polyesters and polyesteramides which have utility include polyesters and polyesteramides prepared from ethylene glycol and adipic acid; propylene glycol and adipic acid; ethylene glycol (80 mol percent), propylene glycol (20 mol percent) and adipic acid; ethylene glycol (80 mol percent), propylene glycol-1,2 (20 mol percent) and azelaic acid; ethylene glycol (80 mol percent), propylene glycol-1,2 (20 mol percent) and sebacic acid; ethylene glycol (80 mol percent), propylene glycol-1,2 (20 mol percent) and dilinoleic acid (20 mol percent); adipic acid (80 mol percent), ethylene glycol (80 mol percent), glycerine monoethyl ether (20 mol percent) and adipic acid; ethylene glycol (80 mol percent), butylene glycol-1,4 (20 mol percent) and adipic acid; ethylene glycol (80 mol percent), propylene glycol-1,3 (20 mol percent) and adipic acid; ethylene glycol (80 mol percent), pentanediol-1,4 (20 mol percent) and adipic acid; ethylene glycol (80 mol percent), glycerine monoisopropyl ether (20 mol percent) and adipic acid; ethylene glycol (80 mol percent), propylene glycol-1,2 (from 18 to 5 mol percent), ethanolamine (from 2 to 15 mol percent) and adipic acid; ethylene glycol (80 mol percent), propylene glycol-1,2 (20 mol percent) and maleic acid (from 3 to 6 mol percent), adipic acid (from 97 to 94 mol percent); ethylene glycol (80 mol percent), propylene glycol-1,2 (from 19 to 17 mol percent), piperazine (from 1 to 3 mol percent) and adipic acid; ethylene glycol (80 mol percent), propylene glycol-1,2 (from 18 to 5 mol percent), dihydroxyethyl aniline (from 2 to 15 mol percent) and adipic acid; ethylene glycol (80 mol percent), butylene glycol-1,4 (20 mol percent) and adipic acid; ethylene glycol (80 mol percent), diethylene glycol (20 mol percent) and adipic acid; ethylene glycol (from 90 to 10 mol percent), propylene glycol-1,2 (from 10 to 90 mol percent) and adipic acid; ethylene glycol (from 90 to 10 mol percent), propylene glycol-1,2 (from 10 to 90 mol per cent) and azelaic acid, etc.

The polyesters indicated above as suitable reactants with isocyanates have reactive hydrogen-containing terminal groups, preferably predominantly hydroxyl groups. The polyesters are reaction products of polyols, such as the aforementioned aliphatic polyols and in particular the class of aliphatic polyols containing from two to ten carbon atoms, with polycarboxylic acids having from two to thirty-six carbon atoms, e.g., oxalic acid, succinic acid, maleic acid, adipic acid, sebacic acid, isosebacic acids, phthalic acids, and dimer acids such as those obtained by coupling two molecules of linoleic acid.

Another preferred class of polymers having terminal groups that contain reactive hydrogen atoms and are suitable for reaction with polyisocyanates are the lactone polymers, preferably those having molecular weights within the range of about 500 to 10,000. These include polymers formed by reaction of polyfunctional initiators having reactive hydrogen atoms with one or more lactones, whereby the lactone rings are successively opened and added to one another as lactone residues to form long chains, as well as copolymers in which there are random or ordered distributions of opened lactone residues and alkylene oxides in the chain, and block copolymers thereof. The lactones that are particularly suitable in polymers and copolymers of this type are the epsilon-caprolactones, preferably the unsubstituted caprolactones and caprolactones having up to about three alkyl substituents on the ring. The lactone residues in heteric and block copolymers may be linked by oxyalkylene chains derived from ethylene oxide, propylene oxide, butylene oxide or the like, and by polyoxyalkylene chains, e.g., polyexypropylene, polyoxyethylene, polyoxybutylene chains or mixtures or copolymers thereof.

It is also to be understood that a compound containing reactive —NCY groups and reactive hydrogen, such as a prepolymeric reaction product of any of the foregoing polymers with an isocyanate, can be reacted with itself or with a compound containing reactive hydrogen, such as water, a polyol or an aminoalcohol.

It is to be expected that numerous modifications will readily become apparent to those skilled in the art upon reading this description. All such modifications are intended to be included within the scope of the invention as defined in the appended claims.

The methods of the invention can be carried out continuously or by batch processes. A particular embodiment of the invention includes methods for producing, batchwise or continuously, polyurethanes suitable for the manufacture of foams by the so-called "prepolymer" and "semi or quasi prepolymer" techniques. Briefly, the "prepolymer" technique comprises reacting a compound containing at least two active hydrogen atoms and a polyisocyanate in the presence of the catalyst compositions herein disclosed in such proportions as to produce a liquid product which requires only the addition of water and catalyst to give a complete foam. In the "semi or quasi prepolymer" technique, the active hydrogen containing compound is reacted with a large excess of polyisocyanate to produce a liquid product of relatively low viscosity and a high isocyanate content. This "semi prepolymer" is then further reacted with additional active hydrogen containing compound or compounds, water and catalyst to produce a foam.

The following examples will serve to further illustrate the practice of the invention but should not be considered as limitative thereof.

*Example 1*

*Part A.*—100 grams of a polyester of adipic acid and 1,2,6-hexanetriol having a hydroxyl number of 285 and a carboxyl number of 0.33 were mixed vigorously at room temperature with 72 grams of an 80:20 mixture of 2,4- and 2,6-tolylene diisocyanate, 2.5 grams water, 0.5 gram non-ionic emulsifying agent ("Emulphor EL–719," an aliphatic polyglycol ester-ether) and 0.3 gram tri-n-butylstibine oxide as catalyst.

As soon as the mixture started foaming, it was transferred to an open mold and allowed to expand. The foam reached its full height in about one minute and was sufficiently well cured after five minutes to be removed from the mold. The finished foam was rigid, had a very small cell texture and possessed a density of about 2.6 lbs./cu. ft.

*Part B.*—The procedure of Part A was repeated, the antimony catalyst however being replaced by 0.3 gram tri-n-butylarsine oxide.

The resulting foam reached its full height in about two minutes and was fully cured within about twenty minutes. It was rigid, had an even cell structure and possessed a density of about 4.5 lbs./cu. ft.

*Part C.*—The procedure of Part A was again repeated, this time however with 1.0 gram N-methylmorpholine as the catalyst.

The resulting foam expanded slowly and several hours were required to obtain a satisfactory cure. It had a density of about 3.0 lbs./cu. ft.

The results of the tests described in Parts A, B and C of this example demonstrate the greater effectiveness of the catalysts used in the method of the invention as compared with that of one of the most widely used catalysts, N-methylmorpholine, for this purpose. They also demonstrate the correlation of test results reported previously herein relative to reaction of phenyl isocyanate with methanol to the superior results that are to be expected in reacting various isocyanates and isothiocyanates with various polyesters, polyethers, prepolymers and the like that contain reactive hydrogen, as determined by the Zerewitinoff method.

*Example 2*

A recipe was prepared comprising:

(a) 75 grams of a polypropylene glycol having a molecular weight of 2010, and 75 grams of a reaction product of glycerol and propylene oxide having a molecular weight of 2990.
(b) 55.3 grams of an 80:20 mixture of 2,4- and 2,6-tolylene diisocyanate.
(c) 4.0 grams of water.
(d) 1.25 grams of an emulsifier.
(e) 0.1 gram of 1,4-diaza-bicyclo-[2,2,2] octane.
(f) 1.0 gram of tributylarsine.

The resulting foam had a density of 4.76 lbs./cu. ft.

*Example 3*

A recipe was prepared comprising:

(a) 75 grams of a polypropylene glycol having a molecular weight of 2010, and 75 grams of a reaction product of glycerol and propylene oxide having a molecular weight of 2990.
(b) 55.3 grams of an 80:20 mixture of 2,4- and 2,6-tolylene diisocyanate.
(c) 4.0 grams of water.
(d) 1.25 grams of an emulsifier.
(e) 0.1 gram of 1,4-diaza-bicyclo-[2,2,2] octane.
(f) 1.0 gram tributylstibine.

The resulting foam cured well and had a density of 2.28 lbs./cu. ft.

Example 4

A recipe was prepared comprising:

(a) 75 grams of a polypropylene glycol having a molecular weight of 2010 and 75 grams of a reaction product of glycerol and propylene oxide having a molecular weight of 2990.
(b) 55.3 grams of an 80:20 mixture of 2,4- and 2,6-tolylene diisocyanate.
(c) 4.0 grams of water.
(d) 1.25 grams of an emulsifier.
(e) 0.1 gram of 1,4-diaza-bicyclo-[2,2,2] octane.
(f) 1.0 gram of triethylstibine oxide.

In all instances the resulting foams cured faster than similar recipes employing a tertiary amine catalyst alone.

What is claimed is:

1. Method which comprises reacting an organic compound containing a reactive —N=C=Y group in which Y is a member selected from the group consisting of oxygen and sulfur with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth.

2. Method which comprises reacting an organic isocyanate with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth.

3. Method which comprises reacting an organic monoisocyanate with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth.

4. Method which comprises reacting an organic diisocyanate with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth.

5. Method which comprises reacting an aromatic isocyanate with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth.

6. Method which comprises reacting an organic compound containing a reactive —N=C=Y group in which Y is a member selected from the group consisting of oxygen and sulfur with a substance having reactive hydrogen as determined by the Zerewitinoff method in the presence of a catalytic amount of an organic arsenic compound having a direct carbon to arsenic bond.

7. Method which comprises reacting an organic compound containing a reactive —N=C=Y group in which Y is a member selected from the group consisting of oxygen and sulfur with a substance having reactive hydrogen as determined by the Zerewitinoff method in the presence of a catalytic amount of an organic antimony compound having a direct carbon to antimony bond.

8. Method which comprises reacting an organic compound containing a reactive —N=C=Y group in which Y is a member selected from the group consisting of oxygen and sulfur with a substance having reactive hydrogen as determined by the Zerewitinoff method in the presence of a catalytic amount of an organic bismuth compound having a direct carbon to bismuth bond.

9. Method which comprises reacting an organic compound containing a reactive —N=C=Y group in which Y is a member selected from the group consisting of oxygen and sulfur with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth and a bond from the atom in said last-named group to a member selected from the group consisting of halogen, hydrogen, oxygen, sulfur and nitrogen atoms.

10. Method which comprises reacting an organic compound containing a reactive —N=C=Y group in which Y is a member selected from the group consisting of oxygen and sulfur with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth and a bond from the atom in said last-named group to halogen.

11. Method which comprises reacting an organic compound containing a reactive —N=C=Y group in which Y is a member selected from the group consisting of oxygen and sulfur with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth and a bond from the atom in said last-named group to hydrogen.

12. Method which comprises reacting an organic compound containing a reactive —N=C=Y group in which Y is a member selected from the group consisting of oxygen and sulfur with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth and a bond from the atom in said last-named group to oxygen.

13. Method which comprises reacting an organic compound containing a reactive —N=C=Y group in which Y is a member selected from the group consisting of oxygen and sulfur with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth and a double bond from the atom in said last-named group to oxygen.

14. Method which comprises reacting an organic compound containing a reactive —N=C=Y group in which Y is a member selected from the group consisting of oxygen and sulfur with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth and a bond from the atom in said last-named group to sulfur.

15. Method which comprises reacting an organic compound containing a reactive —N=C=Y group in which Y is a member selected from the group consisting of oxygen and sulfur with a substance having reactive hydrogen as determined by the Zerewitinoff method in the presence of a catalytic amount of an organic compound of the arsenic family, said compound having a direct bond between carbon and an atom selected from the group consisting of arsenic, antimony and bismuth and a double bond from the atom in said last-named group to sulfur.

16. Method which comprises reacting an organic compound containing a reactive —N=C=Y group in which Y is a member selected from the group consisting of oxygen and sulfur with a substance have reactive hydrogen as determined by the Zerewitinoff method in the presence of a catalytic amount of an organic compound of the arsenic family, said compound having a direct bond between carbon and an atom selected from the group consisting of arsenic, antimony and bismuth and a bond from the atom in said last-named group to nitrogen.

17. Method which comprises mixing and reacting a high molecular weight polymer having at least two end groups consisting of reactive hydrogen with an organic polyisocyanate in the presence of a catalytic amount of an organic compound of the arsenic family, said compound having a direct bond between carbon and an atom selected from the group consisting of arsenic, antimony and bismuth.

18. Method which comprises mixing and reacting a polyoxyalkylene polyol with an organic polyisocyanate in the presence of a catalytic amount of an organic compound of the arsenic family, said compound having a direct bond between carbon and an atom selected from the group consisting of arsenic, antimony and bismuth.

19. Method which comprises mixing and reacting a polyester of a polyhydric alcohol and a polycarboxylic acid and having terminal groups containing reactive hydrogen atoms with an organic polyisocyanate in the presence of a catalytic amount of an organic compound of the arsenic family, said compound having a direct bond between carbon and an atom selected from the group consisting of arsenic, antimony and bismuth.

20. Method which comprises mixing and reacting castor oil with an organic polyisocyanate in the presence of a catalytic amount of an organic compound of the arsenic family, said compound having a direct bond between carbon and an atom selected from the group consisting of arsenic, antimony and bismuth.

21. Method which comprises mixing and reacting epsilon-caprolactone polyester having terminal groups containing reactive hydrogen as determined by the Zerewitinoff method with an organic polyisocyanate in the presence of a catalytic amount of an organic compound of the arsenic family, said compound having a direct bond between carbon and an atom selected from the group consisting of arsenic, antimony and bismuth.

22. Method which comprises mixing and reacting a polyester of a polyhydric alcohol and a polycarboxylic acid and having terminal hydroxyl groups with water and an organic diisocyanate in the presence of a catalytic amount of an organic compound of the arsenic family, said compound having a direct bond between carbon and an atom selected from the group consisting of arsenic, antimony and bismuth to form a polyurethane foam.

23. Method which comprises mixing and reacting a branched chain adipic acid-1,2,6-hexanetriol polyester having terminal hydroxyl groups with water and an organic diisocyanate in the presence of a catalytic amount of an organic arsenic compound having a direct carbon to arsenic bond to form a rigid polyurethane foam.

24. Method which comprises mixing and reacting a branched chain adipic acid-1,2,6-hexanetriol polyester having terminal hydroxyl groups with water and an organic diisocyanate in the presence of a catalytic amount of an organic antimony compound having a direct carbon to antimony bond to form a rigid polyurethane foam.

25. Method which comprises further polymerizing an organic polymer containing reactive hydrogen as determined by the Zerewitinoff method and reactive NCY groups in which Y is a member selected from the group consisting of oxygen and sulfur by mixing it with a catalytic amount of an organic compound of the arsenic family, said compound having a direct bond between carbon and an atom selected from the group consisting of arsenic, antimony and bismuth.

26. Method which comprises cross-linking and foaming an organic polymer containing reactive hydrogen as determined by the Zerewitinoff method and reactive NCY groups in which Y is a member selected from the group consisting of oxygen and sulfur by mixing it with water and a catalytic amount of an organic compound of the arsenic family, said compound having a direct bond between carbon and an atom selected from the group consisting of arsenic, antimony and bismuth.

27. A method which comprises reacting an organic isocyanate with an organic compound having reactive hydrogen as determined by the Zerewitinoff method in the presence of a catalytic amount of triphenylstibine dichloride.

28. Method which comprises reacting an organic compound containing a reactive —N=C=Y group in which Y is a member selected from the group consisting of oxygen and sulfur with a compound containing an active hydrogen atom as determined by the Zerewitinoff method in the presence of a catalytic amount of a catalyst composition comprising a tertiary amine and an organic compound of the arsenic family said compound having a direct bond between carbon and an atom selected from the group consisting of arsenic, antimony and bismuth wherein the molar concentration ratios of organo metal compound and tertiary amine varies from 100:1 to 1:10,000.

29. Method which comprises reacting an organic monoisocyanate with a substance having a reactive hydrogen atom as determined by the Zerewitinoff method in the presence of a catalytic composition comprising a tertiary amine and an organic compound of the arsenic family said compound having a direct bond between carbon and an atom selected from the group consisting of arsenic, antimony and bismuth wherein the molar concentration ratios of organo metal compound and tertiary amine varies from 100:1 to 1:10,000.

30. Method which comprises reacting an organic diisocyanate with a substance having a reactive hydrogen atom as determined by the Zerewitinoff method in the presence of a catalytic amount of a catalyst composition comprising a tertiary amine and an organic compound of the arsenic family said compound having a direct bond between carbon and an atom selected from the group consisting of arsenic, antimony and bismuth wherein the molar concentration ratios of organo metal compound and tertiary amine varies from 100:1 to 1:10,000.

31. Method which comprises reacting an organic compound containing a reactive —N=C=Y group in which Y is a member selected from the group consisting of oxygen and sulfur with a compound containing an active hydrogen atom as determined by the Zerewitinoff method in the presence of a catalytic amount of a catalyst composition comprising a tertiary amine and an organic compound of the arsenic family said compound having a direct bond between carbon and an atom selected from the group consisting of arsenic, antimony and bismuth wherein the molar concentration ratios of organo metal compound and tertiary amine varies from 100:1 to 1:10,000 and a double bond from the atom in said last-named group to oxygen.

32. Method which comprises reacting an organic isocyanate with a compound containing an active hydrogen atom as determined by the Zerewitinoff method in the presence of a catalytic amount of a catalyst composition comprising a tertiary amine and tributylarsine wherein the molar concentration ratios of tributylarsine and tertiary amine varies from 100:1 to 1:10,000.

33. Method which comprises reacting an organic isocyanate with a compound containing an active hydrogen atom as determined by the Zerewitinoff method in the presence of a catalytic amount of a catalyst composition comprising a tertiary amine and tributylstibine wherein the molar concentration ratios of tributylstibine and tertiary amine varies from 100:1 to 1:10,000.

34. Method which comprises reacting an organic isocyanate with a compound containing an active hydrogen atom as determined by the Zerewitinoff method in the presence of a catalytic amount of a catalyst composition comprising a tertiary amine and triethylstibine oxide wherein the molar concentration ratios of triethylstibine oxide and tertiary amine varies from 100:1 to 1:10,000.

References Cited by the Examiner

UNITED STATES PATENTS

| | | | |
|---|---|---|---|
| 2,650,212 | 8/1953 | Windemuth | 260—75 |
| 2,671,082 | 3/1954 | Stallman | 260—77 |
| 2,764,565 | 9/1956 | Hoppe et al. | 260—2.5 |
| 2,993,813 | 7/1961 | Tischbein | 260—2.5 |
| 3,119,792 | 1/1964 | Schultheis et al. | 260—2.5 |

OTHER REFERENCES

Patentanmeldung F 11946, IV b/39, Klasse 39b, Gruppe 2204, June 21, 1956.

Barringer: "Rigid Urethane Foams-11 Chemistry and Formulations," Du Pont Elastomers Chem. Dept. Bulletin HR-26, April 1958.

Saunders et al.: "Chemical Reviews," 1948, vol. 43.

LEON J. BERCOVITZ, *Primary Examiner.*

DONALD E. CZAJA, *Examiner.*